United States Patent
Ting

(10) Patent No.: US 7,915,853 B2
(45) Date of Patent: Mar. 29, 2011

(54) MOTOR DRIVING APPARATUS

(75) Inventor: Chin-Hsien Ting, Taipei Hsien (TW)

(73) Assignee: Foxnum Technology Co., Ltd., Tucheng, Taipei County (TW)

( * ) Notice: Subject to any disclaimer, the term of this patent is extended or adjusted under 35 U.S.C. 154(b) by 319 days.

(21) Appl. No.: 12/269,050

(22) Filed: Nov. 12, 2008

(65) Prior Publication Data

US 2010/0090627 A1 Apr. 15, 2010

(30) Foreign Application Priority Data

Oct. 10, 2008 (CN) .......................... 2008 1 0304883

(51) Int. Cl.
*H02M 7/00* (2006.01)
*H02P 27/06* (2006.01)
*H02P 3/14* (2006.01)

(52) U.S. Cl. ........ 318/803; 318/800; 318/801; 318/376; 363/67; 363/71

(58) Field of Classification Search .................. 318/376, 318/441, 800, 801, 803; 363/34, 35, 37, 363/40, 44, 55, 60, 61, 67, 70, 71, 108, 109, 363/125, 131

See application file for complete search history.

(56) References Cited

U.S. PATENT DOCUMENTS

| | | | | |
|---|---|---|---|---|
| 5,694,307 | A * | 12/1997 | Murugan | 363/37 |
| 6,333,611 | B1 * | 12/2001 | Shibuya et al. | 318/370 |
| 6,542,390 | B2 * | 4/2003 | Bixel | 363/71 |
| 6,611,126 | B2 * | 8/2003 | Mizuno | 318/801 |
| 6,737,762 | B2 * | 5/2004 | Koenig | 307/48 |
| 6,919,711 | B2 * | 7/2005 | Haydock et al. | 322/24 |
| 7,106,023 | B2 * | 9/2006 | Ota et al. | 318/803 |
| 7,227,323 | B2 * | 6/2007 | Yamada et al. | 318/376 |
| 2009/0218976 | A1 * | 9/2009 | Iwashita et al. | 318/441 |

* cited by examiner

*Primary Examiner* — Walter Benson
*Assistant Examiner* — Eduardo Colon-Santana
(74) *Attorney, Agent, or Firm* — Zhigang Ma

(57) ABSTRACT

A system for driving a motor includes first and second rectifier circuits, a direct current (DC) link circuit, an inverter circuit, a voltage booster circuit, and a switch control circuit. When the motor is at a deceleration state, a micro control unit (MCU) outputs a first charging signal to turn on a switch of a first relay and turn off a switch of a second relay, a regenerative current from the motor is charged into a storage capacitor. Before the motor is in an acceleration state, the MCU outputs a second charging signal to turn on the switch of the second relay and turn off the switch of the first relay, and turn on a boosting switch, an increased voltage of the storage capacitor is charged into another storage capacitor. When a voltage at the DC link circuit reaches a predetermined value, the MCU controls the inverter circuit to accelerate the motor.

7 Claims, 2 Drawing Sheets

US 7,915,853 B2

MOTOR DRIVING APPARATUS

BACKGROUND

1. Technical Field

The present disclosure relates to driving apparatuses, and particularly to a motor driving apparatus to drive motors.

2. Description of Related Art

In a motor driving apparatus, a large drive current for acceleration is caused to flow in motor acceleration (power ruining) period, and a regenerative current is generated in deceleration period. However, the regenerative current generated in deceleration period is thermally consumed by a regenerative resistor, resulting in wasted energy loss. For example, when a motor of a computer numerical control (CNC) device is driven by a motor driving apparatus, the motor is accelerated via a large drive current. However, when the motor is decelerated, a regenerative current is generated and then the regenerative current is thermally consumed by a regenerative resistor, which is wasted.

What is needed is to provide a motor driving apparatus to overcome the above-described shortcomings.

DETAILED DESCRIPTION

Figure 1:
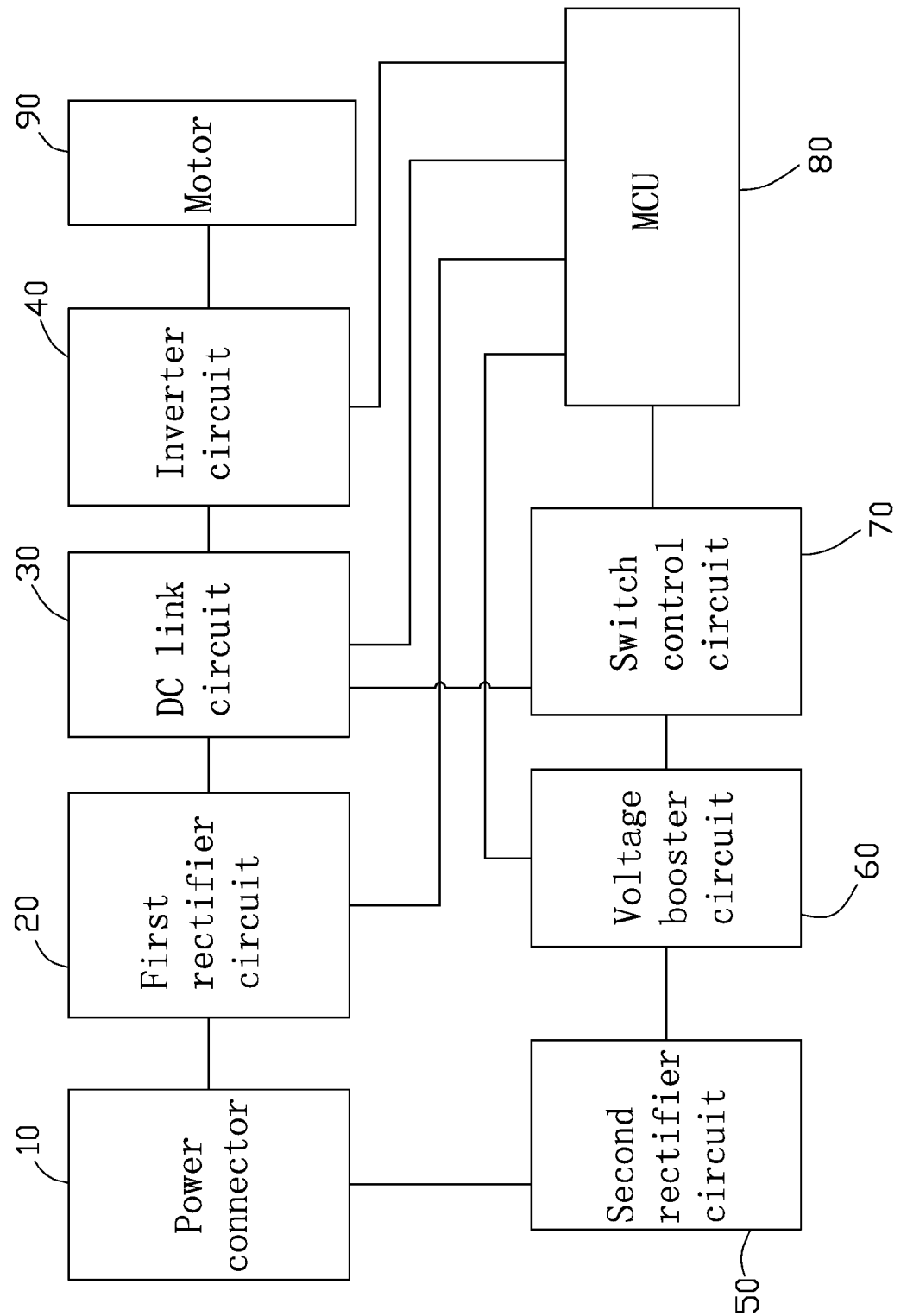
FIG. 1 is a block diagram of an exemplary embodiment of a motor driving apparatus.
Figure 2:
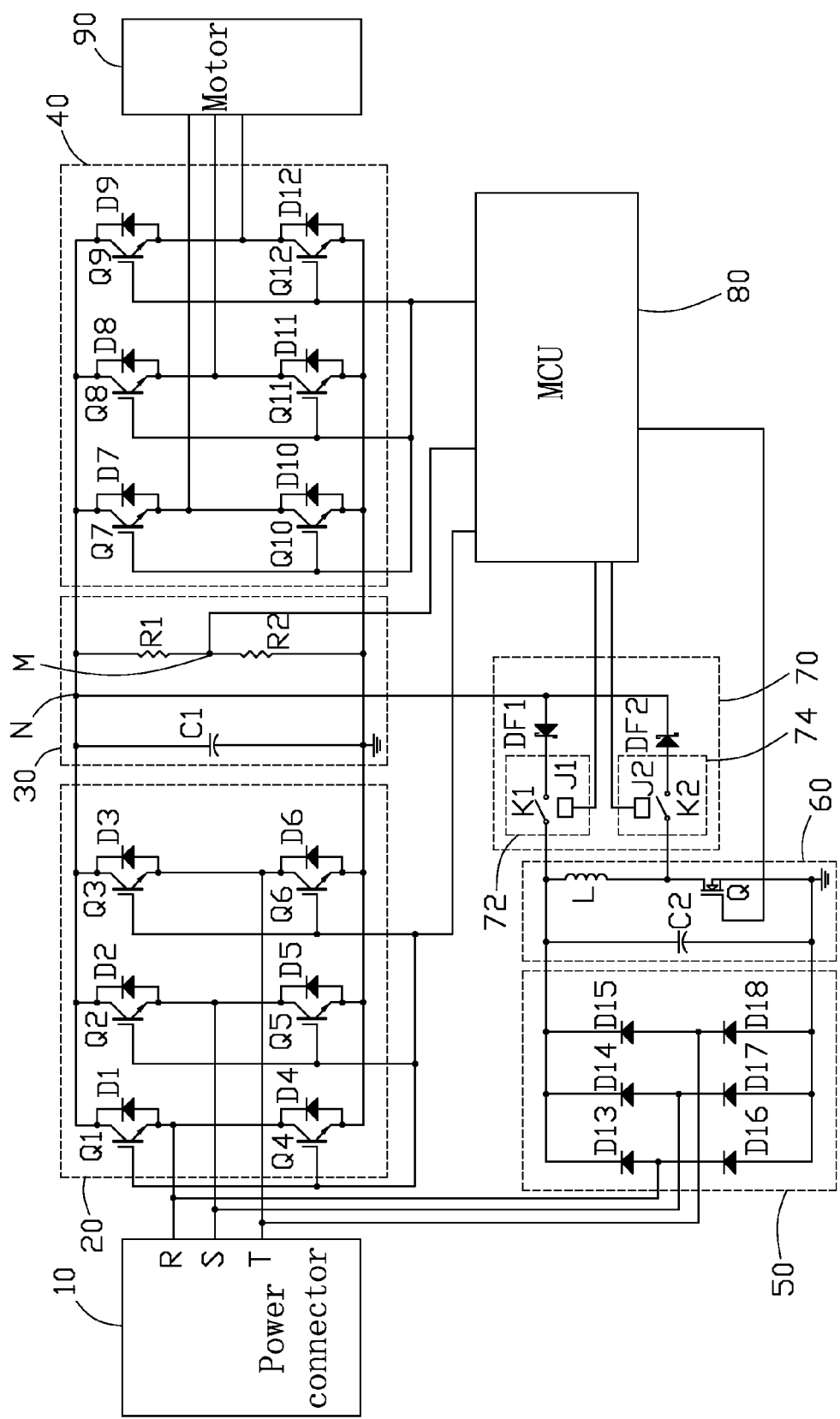
FIG. 2 is one example of a detailed circuit diagram of FIG. 1.

Referring to FIGS. 1 and 2, an exemplary embodiment of a motor driving apparatus includes a power connector 10, a first rectifier circuit 20, a direct current (DC) link circuit 30, an inverter circuit 40, a second rectifier circuit 50, a voltage booster circuit 60, a switch control circuit 70, and a micro control unit (MCU) 80. The power connector 10 includes a first terminal R, a second terminal S, and a third terminal T, configured for connecting to a three-phase alternating current (AC) power source (not shown) to receive three-phase AC power from the three-phase AC power source. The inverter circuit 40 is configured for connecting to a motor 90 to drive the motor 90.

The first rectifier circuit 20 is configured for receiving the three-phase AC power via the power connector 10 and for converting the three-phase AC power to DC power. The first rectifier circuit 20 includes six transistors Q1-Q6 and six diodes D1-D6. The first terminal R of the power connector 10 is connected to an emitter of the transistor Q1 and a collector of the transistor Q4. The second terminal S of the power connector 10 is connected to an emitter of the transistor Q2 and a collector of the transistor Q5. The third terminal T of the power connector 10 is connected to an emitter of the transistor Q3 and a collector of the transistor Q6. Bases of the transistors Q1-Q6 are connected to the MCU 80. Collectors of the transistors Q1-Q3 and emitters of the transistors Q4-Q6 are connected to the DC link circuit 30. The diodes D1-D6 are connected in parallel to one of the transistors Q1-Q6 correspondingly. The diodes D1-D6 are configured for converting the three-phase AC power to DC power, and the transistors Q1-Q6 are controlled to be turned on and off by the MCU 80 for feeding regenerative currents back to the three-phase AC power source.

The DC link circuit 30 is configured for receiving the DC power from the first rectifier circuit 20 and transmitting the DC power to the inverter circuit 40. The DC link circuit 30 includes a first storage capacitor C1 and two voltage-dividing resistors R1 and R2. A first terminal of the first storage capacitor C1 is connected to the collectors of the transistors Q1-Q3, and connected to the switch control circuit 70. A second terminal of the first storage capacitor C1 is connected to the emitters of the transistors Q4-Q6 and ground. The resistors R1 and R2 are connected in series and then connected in parallel to the first storage capacitor C1. A node M between the two resistors R1 and R2 is connected to the MCU 80 to transmit a DC voltage at the node M to the MCU 80. It may be understood that the voltage at the node M serves as a voltage divider. The first and second terminals of the first storage capacitor C1 are connected to the inverter circuit 40.

The inverter circuit 40 is configured for receiving the DC power and converting the DC power to three-phase AC power to drive the motor 90. The inverter circuit 40 includes six transistors Q7-Q12 and six diodes D7-D12. Collectors of the transistors Q7-Q9 are connected to the first terminal of the first storage capacitor C1. Emitters of the transistors Q10-Q12 are connected to the second terminal of the first storage capacitor C1. Bases of the transistors Q7-Q12 are connected to the MCU 80. An emitter of the transistor Q7 and a collector of the transistor Q10 are connected to a first terminal of the motor 90. An emitter of the transistor Q8 and a collector of the transistor Q11 are connected to a second terminal of the motor 90. An emitter of the transistor Q9 and a collector of the transistor Q12 are connected to a third terminal of the motor 90. The diodes D7-D12 are connected in parallel to one of the transistors Q7-Q12 correspondingly. The transistors Q1-Q6 are controlled to be turned on and off by the MCU 80 for supplying power to the motor 90.

The second rectifier circuit 50 is configured for receiving the three-phase AC power via the power connector 10 and converting the three-phase AC power to DC power. The second rectifier circuit 50 includes six diodes D13-D18. The first terminal R of the power connector 10 is connected to the anode of the diode D13 and the cathode of the diode D16. The second terminal S of the power connector 10 is connected to the anode of the diode D14 and the cathode of the diode D17. The third terminal T of the power connector 10 is connected to the anode of the diode D15 and the cathode of the diode D18. The cathodes of the diodes D13-D15 and the anodes of diodes D16-D18 are connected to the voltage booster circuit 60.

The voltage booster circuit 60 is configured for boosting voltage from the DC link circuit 30. The voltage booster circuit 60 includes a second storage capacitor C2, a boosting switch such as a field effect transistor Q, and an inductor L. A first terminal of the second storage capacitor C2 is connected to the cathodes of the diodes D13-D15, and connected to a first terminal of the inductor L. A second terminal of the second storage capacitor C2 is connected to the anodes of diodes D16-D18, and connected to a source of the transistor Q, and connected to ground. A second terminal of the inductor L is connected to a drain of the transistor Q. A gate of the transistor Q is connected to the MCU 80. The first and second terminals of the inductor L are connected to the switch control circuit 70.

The switch control circuit 70 includes a deceleration switch unit and an acceleration switch unit. The deceleration switch unit includes a first relay 72 and a first voltage regulator diode DF1. The first relay 72 includes a switch K1 and a coil J1. A first terminal of the switch K1 is connected to the first terminal of the inductor L. A second terminal of the switch K1 is connected to the cathode of the first voltage regulator diode DF1. The anode of the first voltage regulator diode DF1 is connected to a node N between the capacitor C1 and the resistor R1 of the DC link circuit 30. The coil J1 is connected to the MCU 80 thus, the MCU can turn on and turn off the switch K1. The acceleration switch unit includes a second relay 74 and a second voltage regulator diode DF2. The second relay 74 includes a switch K2 and coil J2. A first terminal of the switch K2 is connected to the second terminal of the inductor L. A second terminal of the switch K2 is connected the anode of the second voltage regulator diode DF2. The cathode of the second voltage regulator diode DF2 is connected to the node N of the DC link circuit 30. The coil J2 is connected to the MCU 80 to control the switch K2 to be turned on and off.

In work, the first rectifier circuit 20 receives the three-phase AC power via the power connector 10 and converts the three-phase AC power to DC power. The DC link circuit 30 transmits the DC power to the inverter circuit 40. The MCU 80 controls the transistors Q7-Q12 of the inverter circuit 40 to be turned on and/or turned off so as to drive the motor 90 in accordance with a command supplied from a controller such as a numerical controller (not shown) for controlling the motor driving apparatus.

When the motor 90 is controlled by the MCU 80 at a deceleration state, a regenerative current is generated via the deceleration of the motor 90. At this time, the voltage at the nodes N and M of the DC link circuit 30 is increased. The MCU 80 outputs a first charging signal, according to the increased voltage at the node N, to turn on the switch K1 of the first relay 72 and turn off the switch K2 of the second relay 74. Thus, the regenerative current is charged into the second storage capacitor C2, and a superfluous regenerative current is fed back to the three-phase AC power source by controlling the transistors Q1-Q6 of the first rectifier circuit 20 via MCU 80.

Before the motor 90 is controlled by the MCU 80 at be in an acceleration state, the MCU 80 outputs a second charging signal to turn on the switch K2 of the first relay 74 and turn off the switch K1 of the second relay 72, and turn on the transistor Q. At this time, a voltage of the second storage capacitor C2 is increased by the inductor L, the increased voltage is charged into the first storage capacitor C1. The MCU 80 receives the voltage at the node M of the DC link circuit 30, and when the voltage at the node M reaches to a predetermined value, the MCU 80 controls the inverter circuit 40 to accelerate the motor 90. Therefore, the regenerative current is effectively recycled to accelerate the motor 90, which can save energy.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A system for driving a motor, the system comprising:
    first and second rectifier circuits configured for receiving a three-phase alternating current (AC) power and for converting the three-phase AC power to direct current (DC) power;
    a DC link circuit configured for receiving the DC power from the first rectifier circuit, wherein the DC link circuit comprises a first storage capacitor, and wherein the DC link circuit is connected to a micro control unit (MCU) for supplying voltage to the MCU;
    an inverter circuit configured for receiving the DC power from the DC link circuit and for converting the DC power to three-phase AC power to control acceleration and deceleration of the motor;
    a voltage booster circuit configured for receiving the DC power from the second rectifier circuit, wherein the voltage booster circuit comprises a second storage capacitor, a boosting switch, and an inductor, first and second terminals of the second storage capacitor are connected to two terminals of the second rectifier circuit, a first terminal of the inductor is connected to the first terminal of the second storage capacitor, a second terminal of the inductor is connected to a first terminal of the boosting switch, a second terminal of the boosting switch is connected to the second terminal of the second storage capacitor and ground, a control terminal of the boosting switch is connected to the MCU; and
    a switch control circuit comprising a first relay and a second relay, wherein a first terminal of a switch of the first relay is connected to the first terminal of the inductor, a second terminal of the switch of the first relay is connected to the DC link circuit, a coil of the first relay is connected to the MCU, a first terminal of a switch of the second relay is connected to a second terminal of the inductor, a second terminal of the switch of the second relay is connected to the DC link circuit, a coil of the second relay is connected to the MCU;
    wherein the MCU outputs a first charging signal to turn on the switch of the first relay and turn off the switch of the second relay so as control deceleration of the motor such that a regenerative current from the motor is charged into the second storage capacitor, wherein the MCU controls the inverter circuit to accelerate the motor when a voltage at the DC link circuit reaches a predetermined value;
    and wherein the MCU outputs a second charging signal to turn on the switch of the second relay and turn off the switch of the first relay, and turn on the boosting switch before the MCU controls acceleration of the motor such that an increased voltage of the a second storage capacitor is charged into the first storage capacitor.

2. The system of claim 1, wherein the first rectifier circuit comprises first-sixth transistors and first-sixth diodes, a first terminal of a power connector is connected to an emitter of the first transistor and a collector of the fourth transistor, a second terminal of the power connector is connected to an emitter of the second transistor and a collector of the fifth transistor, a third terminal of the power connector is connected to an emitter of the third transistor and a collector of the sixth transistor, bases of the first-sixth transistors are connected to the MCU, collectors of the first-third transistors and emitters of the fourth-sixth transistors are connected to the DC link circuit, the first-sixth diodes each are connected in parallel to one of the first-sixth transistors correspondingly.

3. The system of claim 1, wherein the DC link circuit further comprises two voltage-dividing resistors, a first terminal of the first storage capacitor is connected to the first rectifier circuit and connected to the switch control circuit, a second terminal of the first storage capacitor is connected to the rectifier circuit and then connected to ground, the two resistors are connected in series and then connected in parallel to the first storage capacitor, a node between the two resistors is connected to the MCU for receiving the voltage from the DC link, circuit the first and second terminals of the first storage capacitor are connected to the inverter circuit.

4. The system of claim 1, wherein the inverter circuit comprises first-sixth transistors and first-sixth diodes, collectors of the first-third transistors are connected to a first terminal of the first storage capacitor, emitters of the fourth-sixth transistors are connected a second terminal of the first storage capacitor, bases of the first-sixth transistors are connected to the MCU, an emitter of the first transistor and a collector of the fourth transistor are connected to a first terminal of the motor, an emitter of the second transistor and a collector of the fifth transistor are connected to a second terminal of the motor, an emitter of the third transistor and a collector of the sixth transistor are connected to a third terminal of the motor, the first-sixth diodes each are connected in parallel to one of the first-sixth transistors correspondingly.

5. The system of claim 1, wherein the second rectifier circuit comprises first-sixth diodes, a first terminal of a power connector is connected to the anode of the first diode and the cathode of the fourth diode, a second terminal of the power connector is connected to the anode of the second diode and the cathode of the fifth diode, a third terminal of the power connector is connected to the anode of the third diode and the cathode of the sixth diode, the cathodes of the first-sixth diodes and the anodes of fourth-sixth diodes are connected to the voltage booster circuit.

6. The system of claim 1, wherein the boosting switch a field effect transistor, the first, second, and control terminals of the boosting switch are corresponding connected to a drain, a source, and a gate of the field effect transistor.

7. The system of claim 1, wherein the switch control circuit further comprises first and second voltage regulator diodes, the first voltage regulator diode is connected between the second terminal of the switch of the first relay and the DC link circuit, the second voltage regulator diode is connected between the second terminal of the switch of the second relay and the DC link circuit.

* * * * *